United States Patent

Kawai

[11] Patent Number: 6,001,169

[45] Date of Patent: Dec. 14, 1999

[54] WOOD-CEMENT BOARD PRODUCT

[75] Inventor: Hidenori Kawai, Tokai, Japan

[73] Assignee: Nichiha Corporation, Japan

[21] Appl. No.: 09/064,296

[22] Filed: Apr. 22, 1998

Related U.S. Application Data

[62] Division of application No. 08/752,604, Nov. 19, 1996, Pat. No. 5,863,477.

[30] Foreign Application Priority Data

May 24, 1996 [JP] Japan ................................. 8-154984

[51] Int. Cl.$^6$ ........................................ C04B 12/00
[52] U.S. Cl. ..................... 106/696; 106/692; 106/705; 106/707; 106/708; 106/709; 106/805
[58] Field of Search ................ 264/82, 333, DIG. 49; 106/705, 706, 692, 805, 696, 707, 708, 709

[56] References Cited

U.S. PATENT DOCUMENTS

| | | | |
|---|---|---|---|
| 3,972,972 | 8/1976 | Yano | 106/805 |
| 4,047,962 | 9/1977 | Copeland | 106/705 |
| 5,188,889 | 2/1993 | Nagatomi et al. | 264/57 |
| 5,482,550 | 1/1996 | Strait | 106/706 |
| 5,534,058 | 7/1996 | Strabala | 106/705 |
| 5,584,895 | 12/1996 | Seike et al. | 264/DIG. 49 |
| 5,672,310 | 9/1997 | Watanabe | 264/297.4 |

FOREIGN PATENT DOCUMENTS 60-86060  5/1985  Japan.

*Primary Examiner*—James Derrington
*Attorney, Agent, or Firm*—Donald S. Dowden; Cooper & Dunham, LLP

[57] ABSTRACT

A wood-cement board is manufactured by a method comprising mixing 30 to 40% by weight of cement material, 20 to 27% by weight of wood flake, and 30 to 40% by weight of fly ash to prepare a raw material mixture, strewing said raw material mixture on a mold panel to form a mat, pressing and pre-curing said mat with moisture, and main-curing said pre-cured mat in an autoclave. Preferably the particle size of said fly ash is selected so that less than 10% by weight of fly ash may remain on the sieve whose opening size is 150 μm and said main-curing process is carried out at a temperature of the saturated aqueous vapor in a range between 140 to 165° C. for 7 to 10 hours.

2 Claims, No Drawings

WOOD-CEMENT BOARD PRODUCT

This is a division of prior application Ser. No. 08/752,604 filed Nov. 19, 1996 now U.S. Pat. No. 5,863,477.

FIELD OF THE INVENTION

The present invention relates to a method of manufacturing a wood-cement board. More particularly the present invention relates to a method of manufacturing a wood-cement board comprising mixing 30 to 40% by weight of cement material, 20 to 27% by weight of wood flake, and 30 to 40% by weight of fly ash to prepare a raw material mixture, strewing said raw material mixture on a mold panel to form a mat, pressing and pre-curing said mat with moisture, and main-curing said pre-cured mat in an autoclave.

BACKGROUND OF THE INVENTION

Recently, plenty of wood-cement boards are used as a siding board of a house. Said wood-cement board is manufactured by the dry or semi-dry method wherein a raw material mixture including cement material and wood flake is strewed on a mold panel to form a mat and said mat is cured by pressing with moisture.

By applying the dry or semi-dry method to mafufacture the wood-cement board, a clear-cut design can be easily given on the surface of the wood-cement board so that the dry or semi-dry method may be useful to manufacture the siding board having a clear-cut design like natural stones or tiles on its surface.

Nevertheless, in a case where said wood-cement board is used as a siding board, said wood-cement board may be exposed to the outside environment such as wind, rain, and the like and when the curing of the cement material in said wood-cement board is not enough, it is feared that said wood-cement board is cracked or bent by said outside environment.

DESCRIPTION OF THE PRIOR ART

Hitherto, a method wherein the mat of the raw-material mixture on the mold panel is treated at a temprature higher than 100° C. under the atmosphere of higher than 1 atm of aqueous vapor pressure after curing to proceed the curing of cement material in said mat has been provided to resolve said problem of the wood-cement board (TOKKAI Sho 60-86060).

Nevertheless, in said traditional method, since silica content in the cement material is insufficient to react with calcium component, complete curing of the cement material can not be expected so that it is difficult to completely prevent cracking and bending of the wood-cement board.

SUMMARY OF THE INVENTION

Accordingly, an object of the present invention is to proceed curing of cement material in the mat of the raw material mixture.

Another object of the present invention is to provide a wood cement board wherein cracking and bending of said wood cement board are prevented.

Further object of the present invention is to provide a wood cement board suitable for the siding board of a house.

Said objects can be attained by providing a method of manufacturing a wood-cement board comprising mixing 30 to 40% by weight of cement material, 20 to 27% by weight of wood flake and 30 to 40% by weight of fly ash to prepare a raw material mixture, strewing said raw material mixture on a mold panel to form a mat, pressing and pre-curing said mat with moisture, and main-curing said pre-cured mat in an autoclave.

The preferable particle size of said fly ash is selected so that less than 10% by weight of fly ash may remain on the sieve whose opening size is 150 $\mu$m and said main-curing is preferably carried out at a temperature of the saturated aqueous vapor in the range between 140 to 165° C. for 7 to 10 hours.

DETAILED DESCRIPTION OF THE INVENTION

The present invention relates to a method of manufacturing a wood-cement board comprising mixing 30 to 40% by weight of cement material, 20 to 27% by weight of wood flake, and 30 to 40% by weight of fly ash to prepare a raw material mixture, strewing said raw material mixture on a mold panel to form a mat, pressing and pre-curing said mat with moisture, and main-curing said pre-cured mat in an autoclave.

Said cement material used in the present invention is such as Portland cement, blast furnace cement, silica cement, alumina cement and the like. Fly ash is added to said cement material to supply silica component. Said fly ash has a fine particle size so that said fly ash has a big surface area for reaction and accordingly said fly ash has a high activity of curing reaction.

Further, said fly ash has a substantially sphere shape to improve flexibility of the resulting mat of the raw material and the resulting wood cement board by the ball bearing like action. The preferable particle size of said fly ash is selected so that less than 10% by weight of fly ash may remain on sieve whose opening is 150 $\mu$m. Preferable size of said wood flake is such that whole wood flake passes through the sieve whose opening size is 10 mm and has an average size which can pass through the sieve whose opening size is 4.5 mm and a thickness less than 1 mm. Said cement material, wood flake, and fly ash are mixed together to prepare the raw material mixture and 30 to 40% by weight of said cement material, 20 to 27% by weight of said wood flake and 30 to 40% by weight of said fly ash are contained in said raw material mixture.

When said fly ash is contained in an amount less than 30% by weight, silica component becomes insufficient for calcium component and the curing reaction cannot be proceeded smoothly and when said fly ash is contained in an amount beyond 40% by weight, bending strength of the resulting wood-cement board becomes lower and the dimension stability of the resulting wood cement board becomes inferior. Further when said wood flake is contained in an amount less than 20% by weight, the reinforcing effect of said wood flake becomes not remarkable and when said wood flake is contained in an amount beyond 27% by weight, the flammability of the resulting wood-cement board becomes inferior.

Said raw material mixture is strewed on a mold panel without adding water in the dry method or in the semi-dry method water is added to said raw material mixture so that the water content of said raw material mixture may be less than 50% by weight and then said raw materials mixture is strewed on a mold panel to form a mat.

Said resulting mat is pre-cured by pressing and heating and after then said pre-cured mat is separated from said mold panel and main-cured in an autoclave. Said pre-curing process is carried out at a pressure in the range between 40 to 80 kgf/cm$^2$, a temperature in the range between 70 to 90° C. for 13 to 17 hours and said main curing process in the autoclave is carried out at a temperature of the saturated aqueous vapor in the range between 140 to 165° C. for 7 to 10 hours. When said mat is formed by the dry method, water is supplied to said mat as vapor or mist during said pre-curing process.

In the present invention, since fly ash having fine particle size and high reaction activity is added in the raw materials as a silica component and further the main-curing process in the autoclave is carried out, said mat is smoothly cured and curing reaction is substantially complete after main-curing process.

Further said main curing process is carried out at a temperature of the saturated aqueous vapor lower than 165° C., the heat deterioration of wood flake during curing process is prevented. Still further since said fly ash has substantially sphere shape, said fly ash gives the resulting mat or the resulting wood cement board a flexibility by the bail bearing like action, cracking or breaking of said mat or said wood cement board is prevented when said mat or said wood cement board is main-cured and separated from the mold panel.

EXAMPLES AND COMPARISONS

Using raw material mixture having formulations shown in Table 1, mats are formed by the dry method and said mats are pressed and cured by the conditions shown in Table 1 to manufacture samples of wood-cement boards, samples Nos.1 to 3 relating to the present invention and samples Nos. 4 to 8 relating to the comparisons.

Mechanical properties of said samples are determined and the results are shown in Table 1.

Sample No.4 relating to the comparison 1 contains fly ash in an amount less than 30% by weight and accordingly has less flexibility and lower Young's modulus of elasticity comparing sample No.1 relating to the present invention and further sample No.4 has a big water absorption ratio and a poor freezing thaw property. Sample No.5 relating to the comparison 2 contains fly ash in an amount beyond 40% by weight and accordingly has less bending strength and lower Young's modulus of elasticity comparing sample No.2 relating to the present invention and further sample No.5 has a pretty big water absorption ratio and a remarkably poor freezing thaw property. Sample Nos.6 and 7 use silica fume and silica powder, respectively, and each sample has a low bending strength and an extremely low flexibility and further a remarkably poor freezing thaw property. Since silica fume used in samples Nos.6 and 7 has a fine particle size, average particle size is 0.2 μm, so that said silica fume has a high reactivity, the mat of each sample is cured smoothly and a matrix having a high density is formed in the mat. Nevertheless, fine cracks are produced in the mat by vibration and bending stress when said mat is released from the mold panel and said fine cracks in the mat do not disappear during the main-curing in the autoclave and accordingly the resulting wood-cement board has poor mechanical properties such as flexibility. Further, since sample No.6 includes silica having angular shape and small contacting area besides fly ash, sample No.6 has low reactivity and cracks are apt to be produced by bending stress in the product. Sample No.8 relating to comparison 5 contains no fly ash and curing reaction does not proceed in the main-curing in the autoclave and accordingly the product has a low bending strength, remarkably low Young's modulus of elasticity and poor flexibility and further, big water absorption ratio and poor freezing thaw property.

Referring to Table 1, it is clear that a wood-cement board having an excellent dimension stability and flexibility is provided in the present invention.

TABLE 1

| | | Example 1 Sample 1 | Example 2 Sample 2 | Example 3 Sample 3 | Comparison 1 Sample 4 | Comparison 2 Sample 5 | Comparison 3 Sample 6 | Comparison 4 Sample 7 | Comparison 5 Sample 8 |
|---|---|---|---|---|---|---|---|---|---|
| Raw material (%) | Portland cement | 42.1 | 36.8 | 31.5 | 48.6 | 25.0 | 36.8 | 36.8 | 73.6 |
| | Fly ash | 31.5 | 36.8 | 42.1 | 25.0 | 48.6 | — | — | — |
| | Silica fume | — | — | — | — | — | 18.4 | 36.8 | — |
| | Silica powder | — | — | — | — | — | 18.4 | — | — |
| | Wood flake | 24.5 | 24.5 | 24.5 | 24.5 | 24.5 | 24.5 | 24.5 | 24.5 |
| | Sodium silicate no. 3 | 1.55 | 1.55 | 1.55 | 1.55 | 1.55 | 1.55 | 1.55 | 1.55 |
| | Waterproofing agent | 0.35 | 0.35 | 0.35 | 0.35 | 0.35 | 0.35 | 0.35 | 0.35 |
| Pressing & Curing | Pressing condition kgf/cm$^2$ | 50 | 55 | 60 | 55 | 55 | 55 | 55 | 55 |
| | Curing condition ° C. + hrs | 80 + 15 | 80 + 15 | 80 + 15 | 80 + 15 | 80 + 15 | 80 + 15 | 80 + 15 | 80 + 15 |
| | Main curing condition (AC) ° C. + hrs | 165 + 9 | 165 + 9 | 165 + 9 | 165 + 9 | 165 + 9 | 165 + 9 | 165 + 9 | 165 + 9 |
| Properties | Specific gravity | 1.01 | 1.03 | 1.02 | 1.01 | 1.00 | 1.00 | 1.02 | 1.03 |
| | Thickness (mm) | 12.3 | 12.1 | 12.0 | 12.0 | 12.6 | 12.4 | 12.3 | 12.3 |
| | Bending strength after primary hardening (kgf/cm$^2$) | 60.0 | 57.9 | 50.7 | 63.9 | 43.5 | 45.8 | 42.8 | 75.2 |
| | Bending strength after incubation (kgf/cm$^2$) *1 | 130 | 138 | 129 | 115 | 93.0 | 91.3 | 91 | 88.3 |
| | Young's modulus (× 10$^3$ kgf/cm$^2$) | 33.0 | 34.6 | 32.3 | 28.8 | 22.1 | 25.3 | 23.1 | 19.3 |
| | Flexibility test *2 | 37 | 40 | 35 | 25 | 15 | 2 | 2 | 1 |
| | Water absorption test (%) *3 | 0.16 | 0.15 | 0.15 | 0.18 | 0.20 | 0.23 | 0.22 | 0.23 |
| | Freezing thaw test *4 thickness swelling ratio (%) | 2.3 | 2.1 | 2.5 | 3.6 | 6.4 | 7.9 | 7.2 | 9.1 |
| | General estimation | ◯ | ◯ | ◯ | Δ | Δ | X | X | X |

*1 Bending strength (JIS A-1409)
*2 Both ends of a test panel having a width 455 mm and a length 3030 mm are supported wherein the distance between both ends supported (span) is 2700 mm and the center of said test panel is lifted up from hanging down situation by its own weight to straight situation and then said test panel is released to restore to the original hanging down situation. The above described up and down oscillation test is repeated until said test panel is broken and the number of repeating times until said test panel is broken was determined.
*3 Water absorption test (JIS A-5422): Each sample was immersed in water for 15 days at room temperature. The elongation ratio of each sample after immersion in water was determined.
*4 Freezing-thaw test (JIS A-1435 30 cycle)

We claim:

1. A wood-cement board made by a method comprising the steps of:

mixing 30 to 40% by weight of cement material, 20 to 27% by weight of wood flake, and 30 to 40% by weight of fly ash selected so that less than 10% by weight of fly ash remains on a sieve whose opening size is 150 μm to prepare a raw material mixture, strewing said raw material mixture on a mold panel to form a mat, pressing and pre-curing said mat with moisture, and main-curing said pre-cured mat in an autoclave.

2. A wood-cement board made by a method comprising the steps of:

mixing 30 to 40% by weight of cement material, 20 to 27% by weight of wood flake, and 30 to 40% by weight of fly ash selected so that less than 10% by weight of fly ash remains on a sieve whose opening size is 150 μm to prepare a raw material mixture, strewing said raw material mixture on a mold panel to form a mat, pressing and pre-curing said mat with moisture, and main-curing said pre-cured mat in an autoclave;

wherein said main-curing process is carried out with a saturated aqueous vapor having a temperature in the range of 140–165° C. for 7 to 10 hours.

* * * * *